Figure 1:
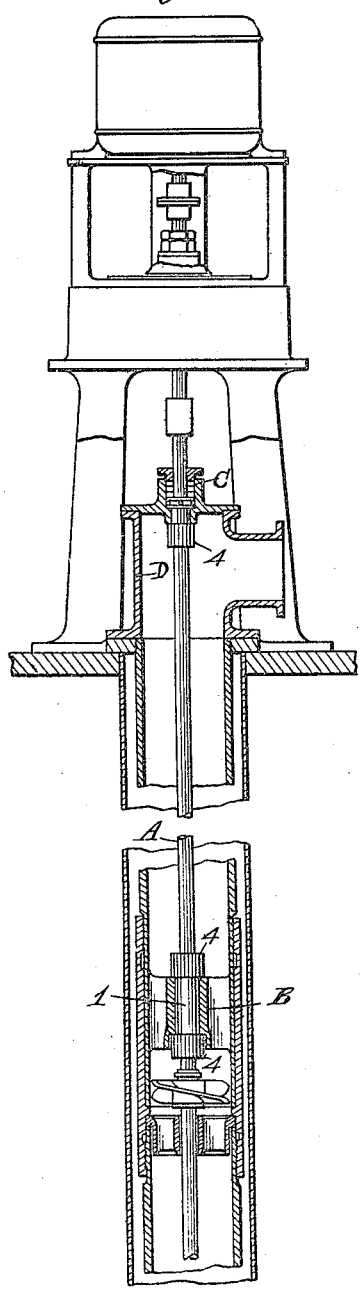

Oct. 7, 1924.

W. D. SNIDER

BEARING PROTECTOR

Filed Feb. 7, 1922

1,510,806

Inventor
Walter D. Snider
By his Attorneys
Philipp, Sawyer, Rice & Kennedy

Patented Oct. 7, 1924.

1,510,806

UNITED STATES PATENT OFFICE.

WALTER D. SNIDER, OF HOLYOKE, MASSACHUSETTS, ASSIGNOR TO WORTHINGTON PUMP AND MACHINERY CORPORATION, OF NEW YORK, N. Y., A CORPORATION OF VIRGINIA.

BEARING PROTECTOR.

Application filed February 7, 1922. Serial No. 534,720.

*To all whom it may concern:*

Be it known that I, WALTER D. SNIDER, a citizen of the United States, residing at Holyoke, county of Hampden, and State of Massachusetts, have invented certain new and useful Improvements in Bearing Protectors, fully described and represented in the following specification and the accompanying drawings, forming a part of the same.

This invention relates to an improvement in means for protecting bearings.

It is an aim of the present invention to provide an improved protecting device for the bearings and stuffing boxes of pumps and similar apparatus employing either rotating or reciprocating shafts or piston rods, whereby sand, grit, dust and other foreign matter will be effectually excluded from the shaft bearings and stuffing boxes thereof, whether such matter is suspended in the medium being pumped or is otherwise brought into contact with the bearing parts. While the device is useful for excluding dust and foreign matter from shaft bearing surfaces and piston rod stuffing boxes of various types of apparatus working under normal conditions, it will be found especially effective in connection with the bearings and stuffing boxes of apparatus necessarily subjected to conditions unfavorable to long life of such parts, as, for instance, deep well pumps, where the presence of sand, grit, and other foreign matter in the pumped medium, or exposure otherwise of the shaft bearings or stuffing boxes thereto, is not only detrimental to the life of the bearings and stuffing box packing, but also to the shafts and piston rods at their wearing surfaces.

To enable others skilled in the art to understand the invention, what is now considered the best embodiments thereof will be described in connection with the accompanying drawings, and the novel features of the invention then be pointed out in the claims.

In the drawings—

Figure 2:
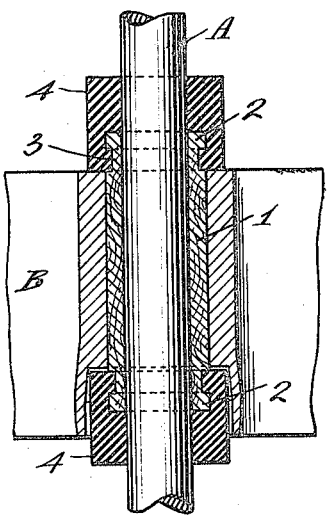
Figure 3:
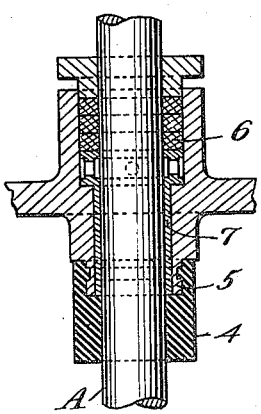

Figure 1 is a side elevation and partial section of a rotary piston deep well pump with the protector applied to one of the bearings and the top stuffing box, and Figures 2 and 3, respectively, are vertical sections of the shaft bearing and stuffing box constructions of Fig. 1.

Referring now to the drawings, the protector is shown at 4 as applied to the stuffing box C at the top of the well shaft-casing D and also to the hub of the stationary guide vanes B forming one of the well rod bearings. While a stuffing box and but one bearing are shown, it will be understood that all the bearings throughout the well-shaft-casing D may, if desired, be provided with similar bearing protectors, which will now be described in detail.

The construction shown in Fig. 2 comprises a bushing 1, preferably of wood, although other material may be used, mounted on the shaft A and having a loose fit thereon to decrease wear, the hub of guide vanes B, in the arrangement here shown, supporting the bushing 1 and holding it from turning. Such bushing, in the preferred construction shown, is provided with an annular flange 2 at one or both ends thereof, and these flanges are conveniently formed by cutting an annular groove 3 near the ends of the bushing, when the latter is, as shown, sufficiently thick to permit this. Mounted on the ends of the bushing 1 are muff-like protectors 4 of suitable resilient or elastic material, and preferably of soft rubber. The protecting members 4 are intended to fit snugly on the rod A and be held in contact therewith at all points by the elastic qualities of the material of which they are composed. The protectors 4 are secured to the bushing 1 by forming the interior cut-away part of such members with flanges and grooves so as to conform to the shape of the grooves 3 and flanges 2, but dimensioned slightly smaller than the corresponding parts on the bushing, so that such protectors may be sprung over the flanges and be held under elastic tension on the bushing. It will be understood, however, that the protectors 4 may be more firmly secured to the bushing, if desired, as by vulcanizing, or by screws and that other securing means than the flanges and grooves may be employed.

While Fig. 3 shows a construction similar to that of Fig. 2, but modified to provide a protected stuffing box at the top of the well shaft casing, and therefore has a rotating shaft passing therethrough, it will be obvious that a similar construction may be employed with equal advantages where the shaft A is a reciprocating member, as, for instance, a pump rod. In the construction of this figure, the protector 4 is secured to a flange formed on the end of a metallic extension 5 of a stuffing box 6 of usual construction, while a metallic bushing 7, which may be integral with a spacing ring 8 positioned in the stuffing box 6, extends into the extension 5 for a suitable distance, and preferably to the end thereof.

From the foregoing it will be clear that the protector 4 will, due to its elastic qualities, closely hug the shaft or rod A, thus effectually excluding dust, sand, grit or other foreign matter from the bearing surfaces, whether the shaft A rotates or reciprocates. It will be obvious, also, that in many cases the rotating member may be mounted on the bushing, which, with the protector 4, will then rotate with such member, while the shaft on which the bushing is mounted may be stationary. In any of the above cases, however, the protector 4 will exclude foreign matter from the bearing surfaces, while enough clean water will be admitted by seepage to lubricate the protector and bearing.

While the invention has been shown and described in what is believed to be its best forms, it will be understood that various changes and modifications may be made therein, while still retaining the invention defined by the claims.

What is claimed is:—

1. A new article of manufacture, consisting of a soft rubber protector for shaft bearings of hydraulic apparatus, said protector being so formed as to surround the shaft at the end of the bearing and be held in contact with the shaft by its elastic qualities, and also having means formed thereon which will enable it to be secured to the bearing casing, so as to exclude sand and the like from the bearing surfaces.

2. A new article of manufacture, consisting of a bushing in which a shaft is arranged to turn, a flange on said bushing, and a protector of resilient material arranged to surround a shaft for excluding sand and the like from the bearing surfaces, said protector being held against displacement by being sprung over the flange on said bushing.

3. A new article of manufacture, consisting of a wood shaft bearing in which a shaft is arranged to turn, flanges on said bearing, and a soft rubber protector arranged to surround said shaft at each end of said bearing for excluding sand and the like from the bearing surfaces, said protectors being held against displacement by being sprung over said flanges.

In testimony whereof, I have hereunto set my hand.

WALTER D. SNIDER.